United States Patent
Ghabra et al.

(10) Patent No.: US 9,566,945 B2
(45) Date of Patent: Feb. 14, 2017

(54) PASSIVE ENTRY PASSIVE START (PEPS) SYSTEM WITH RELAY ATTACK PREVENTION

(71) Applicant: Lear Corporation, Southfield, MI (US)

(72) Inventors: Riad Ghabra, Northville, MI (US); Stephen Humphrey, Livonia, MI (US); Keith A. Christenson, Canton, MI (US); Jason Summerford, Novi, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/712,119

(22) Filed: May 14, 2015

(65) Prior Publication Data
US 2016/0332598 A1    Nov. 17, 2016

(51) Int. Cl.
*B60R 25/30* (2013.01)
*B60R 25/24* (2013.01)

(52) U.S. Cl.
CPC ............... *B60R 25/30* (2013.01); *B60R 25/24* (2013.01)

(58) Field of Classification Search
CPC .......... B60R 25/24; B60R 25/01; B60R 25/20; B60R 25/2072; B60R 25/30; G01S 13/75; G07C 9/00309; G07C 9/00111; G07C 2009/00388; G07C 2009/0096; G07C 2009/00793; H04W 4/046; H01Q 1/324
USPC ......... 340/5.72, 539.23, 686.6, 426.36, 10.5; 701/2
See application file for complete search history.

(56) References Cited

U.S. PATENT DOCUMENTS

| | | |
|---|---|---|
| 5,723,911 A | 3/1998 | Glehr |
| 7,978,049 B2 | 7/2011 | Leitch |
| 8,930,045 B2 * | 1/2015 | Oman .................. G01S 13/765 340/426.36 |
| 9,102,296 B2 * | 8/2015 | Seiberts ............. B60R 25/2072 |
| 9,154,920 B2 * | 10/2015 | O'Brien ............... H04W 4/046 |
| 2013/0143594 A1 | 6/2013 | Ghabra et al. |
| 2014/0248898 A1 | 9/2014 | O'Brien et al. |
| 2014/0253287 A1 | 9/2014 | Bauman et al. |
| 2014/0285319 A1 | 9/2014 | Khan et al. |
| 2014/0308971 A1 | 10/2014 | O'Brien et al. |
| 2014/0330449 A1 | 11/2014 | Oman et al. |

FOREIGN PATENT DOCUMENTS

WO    2005114593 A1    12/2005

OTHER PUBLICATIONS

Intellectual Property Office, Combined Search and Examination Report for the corresponding Great Britain Patent Application No. GB 16027641 dated Aug. 17, 2016.

* cited by examiner

*Primary Examiner* — Ali Neyzari
(74) *Attorney, Agent, or Firm* — Brooks Kushman P.C.

(57) ABSTRACT

A system includes a remote control unit, such as a fob, and a base station at a target, such as a vehicle. The control unit and the base station are configured to communicate authorization signals and time-of-flight (ToF) ranging signals concurrently between one another. The base station is further configured to confirm from the authorization signals whether the control unit is authorized for controlling a target function and to confirm from the ToF ranging signals whether the control unit is within range of the target. The base station is further configured to prevent the target function from being controlled by the control unit when the control unit is not within range of the target.

17 Claims, 5 Drawing Sheets

PASSIVE ENTRY PASSIVE START (PEPS) SYSTEM WITH RELAY ATTACK PREVENTION

TECHNICAL FIELD

The present disclosure relates to passive entry passive start (PEPS) systems.

BACKGROUND

Passive entry passive start (PEPS) systems and remote keyless entry (RKE) systems include a portable remote control unit and a base station. The remote control unit, for instance, a key fob ("fob"), is carried by a user. The base station is at a target device such as a vehicle. The fob and the base station wirelessly communicate with one another for remote control of the target device.

Passive entry functions provided by a vehicular PEPS system include automatically unlocking vehicle doors when an authorized fob is brought into the vicinity of the vehicle. The PEPS system may detect for an authorized fob in response to a vehicle door handle being touched. Passive start functions provided by a vehicular PEPS system include automatically starting the vehicle upon a user in possession of the authorized fob pressing a start button near the driver's seat.

A "relay attack" is a process for deceiving a vehicular PEPS system. A relay attack is typically carried out by two thieves while the vehicle user is remotely located away from the vehicle. Each thief has a transceiver. A first thief stands next to the vehicle. The second thief stands near the vehicle user, whom is carrying an authorized fob. The relay attack begins with the first thief touching the door handle or pressing the start button. The base station of the PEPS system responds by transmitting a short range communication pursuant to the ordinary authentication process. Unlike the first thief transceiver, the fob is too far away to receive the short range communication. The first thief transceiver relays the short range communication to the second thief transceiver. The second thief transceiver retransmits the short range communication to the fob. The fob responds by replying with authorization information. The second thief transceiver relays the authorization information to the base station of the PEPS system. In turn, the base station causes the door to be unlocked or the vehicle to be started. In short, a relay attack includes relaying short range PEPS communication over a relatively long distance without permission of the vehicle user.

SUMMARY

A method includes communicating authorization signals and time-of-flight (ToF) ranging signals concurrently between a portable controller and a base station at a target to confirm from the authorization signals whether the controller is authorized for controlling a target function and to confirm from the ToF ranging signals whether the controller is within range of the target. The method further includes preventing the target function to be controlled when the controller is not within range of the target.

The method may further include enabling the target function to be controlled when the controller is within range of the target and the controller is authorized to control the target function.

The method may further include, prior to communicating the authorization signals between the controller and the base station, communicating wakeup signals between the controller and the base station to wakeup the controller and to acknowledge to the base station that the controller is awake. In this case, the method may further include detecting user interaction with the target and communicating the wakeup signals between the controller and the base station commences upon the user interaction being detected.

The authorization signals may be communicated between the controller and the base station using low-frequency (LF) and ultra-high frequency (UHF) communications and the ToF ranging signals may be communicated between the controller and the base station using ultra-wide-band (UWB) communications.

The authorization signals and the ToF ranging signals may be communicated between the controller and the base station using ultra-wide-band (UWB) communications.

The method may further include using a first microcontroller of the base station in communicating authorization signals from the base station to the controller and in confirming from the authorization signals whether the controller is authorized for controlling the target function, and using a second microcontroller of the base station in communicating ToF ranging signals from the base station to the controller and in confirming from the ToF ranging signals whether the controller is within range of the target.

The method may further include using a primary battery of the controller in communicating authorization signals from the controller to the base station and using a secondary battery of the controller, rechargeable with energy from the primary battery, in communicating ToF ranging signals from the controller to the base station.

A system includes a remote control unit and a base station at a target. The control unit and the base station are configured to communicate authorization signals and ToF ranging signals concurrently between one another. The base station is further configured to confirm from the authorization signals whether the control unit is authorized for controlling a target function and to confirm from the ToF ranging signals whether the control unit is within range of the target. The base station is further configured to prevent the target function from being controlled by the control unit when the control unit is not within range of the target.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
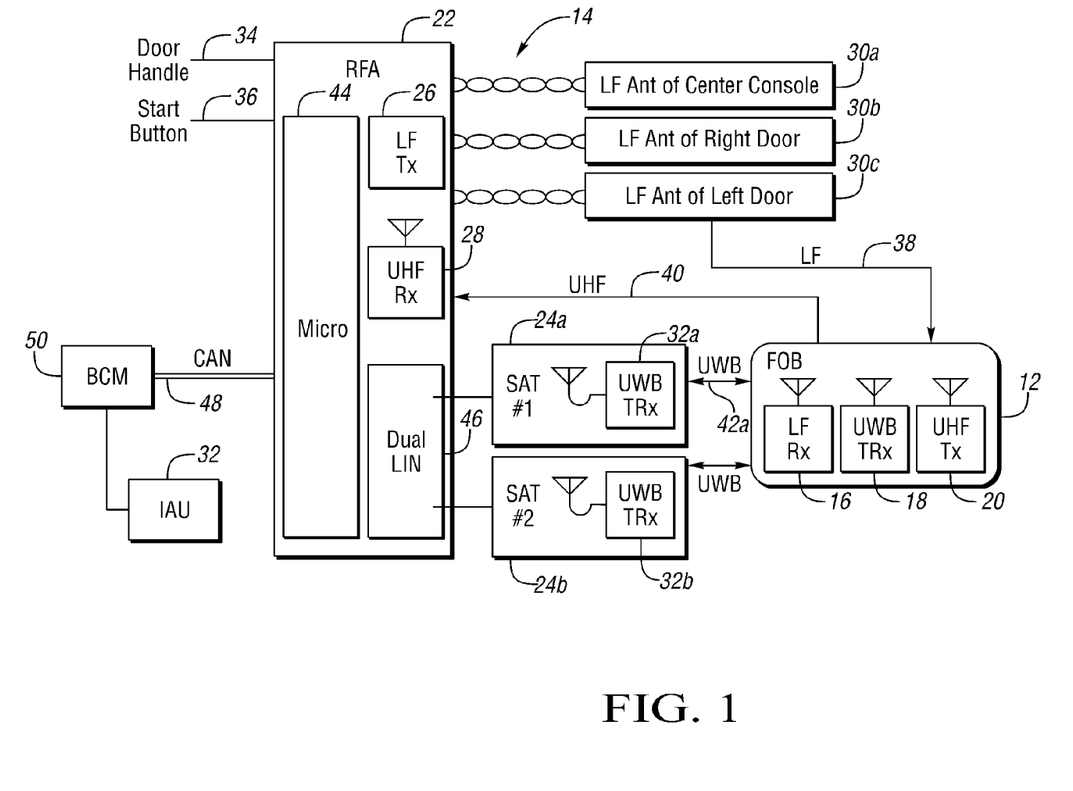
FIG. 1 illustrates a block diagram of a remote control system having a portable remote control unit and a base station.

Referring now to FIG. 1, a block diagram of a remote control system 10 is shown. Remote control system 10 includes a portable remote control unit 12 and a base station 14. Base station 14 is at a target device. The target device is assumed to be a vehicle. In other embodiments, the target device is a house, a garage, a gate, a building, a door, a lighting system, or the like. Base station 14 is configured to be able to control functions of the vehicle. Remote control unit 12 and base station 14 are operable for wirelessly transmitting/receiving signals to/from one another to enable the remote control unit to remotely control the vehicle via the base station.

Remote control system 10 is configured to perform passive entry passive start (PEPS) functions. PEPS capability enables remote control unit 12 to remotely control the vehicle automatically (or "passively") without user actuation of the remote control unit. As an example of a passive entry function, base station 14 unlocks a vehicle door in response to the presence of remote control unit 12 being brought into the vicinity of the vehicle being detected. Base station 14 can detect the presence of remote control unit 12 being brought into the vicinity of the vehicle when a user carrying the remote control unit touches a door handle of the vehicle. As an example of a passive start function, base station 14 starts the vehicle upon a user in possession of remote control unit 12 pressing a start button on the vehicle dashboard.

Remote control system 10 may be further configured to perform remote keyless entry (RKE) functions. RKE capability enables remote control unit 12 to remotely control the vehicle in response to user actuation of buttons or the like of the remote control unit. As an example of a RKE function, base station 14 unlocks a vehicle door in response to receiving a vehicle door unlock command from remote control unit 12. Remote control unit 12 transmits the vehicle door unlock command to base station 14 in response to corresponding user actuation of the remote control unit.

Remote control unit 12 is a portable device to be carried by a user. Remote control unit 12 is assumed to be a key fob ("fob"). In other embodiments, remote control unit 12 is a smart phone, a tablet, a wearable device such as a smart watch, or the like.

In general, in regards to PEPS capability, fob 12 and base station 14 engage in a series of (i) wakeup, (ii) authorization/authentication ("authorization"), and (iii) time of flight ("ToF") communications. The authorization communications take place following the wakeup communications. The ToF communications take place concurrently with the authorization communications and may take place concurrently with the wakeup communications.

The wakeup communications between fob 12 and base station 14 involve "waking up" the fob. The wakeup communications commence upon detecting a user action such as touching a door handle or pressing the vehicle start button.

The authorization communications between fob 12 and base station 14 take place once the fob is woken up. The authorization communications involve authorizing the enablement of a vehicle function (e.g., unlocking a vehicle door or starting the vehicle) corresponding to the detected user action. The authorization communications are intended to verify that fob 12 is authorized for remotely controlling the vehicle.

The ToF communications between fob 12 and base station 14 are for confirming that the fob is within the vicinity of the vehicle. The ToF communications are used to prevent a relay attack. The ToF communications involve measuring time for a signal to travel between fob 12 and base station 14. The rate of time at which the signal travels is known. As such, the time for the signal to travel between fob 12 and base station 14 is a function of the distance between the fob and the base station. Therefore, if the time for the signal to travel between fob 12 and base station 14 is too long, then the fob cannot be within vicinity of the vehicle. In this case, the enablement of the vehicle function is prevented even when the authorization communications authorize the enablement of the vehicle function. The enablement of the vehicle function is prevented because the authorization communications authorizing the enablement of the vehicle function are the subject of a relay attack.

The fact that the authorization communications are being subjected to a relay attack is discerned from detecting the ToF between fob 12 and base station 14 being too long. For instance, as described above in the Background section, during a relay attack an excessive time delay occurs as a result of the extended round trip time by way of the transceivers used by the two thieves.

Thus, base station 14 does not perform the corresponding vehicle function (e.g., unlocking the vehicle door, starting the engine) whenever the ToF communications indicate that fob 12 is not within the vicinity of the vehicle. That is, base station 14 does not perform the corresponding vehicle function when the ToF communications provide a negative result.

Base station 14 performs the corresponding vehicle when both of the authorization and ToF communications provide positive results. That is, base station 14 performs the corresponding vehicle function when (i) the authorization communications verify that fob 12 is authorized for remotely controlling the vehicle and (ii) the ToF communications verify that the fob is within the vicinity of the vehicle.

As indicated, the authorization and ToF communications between fob 12 and base station 14 take place concurrently. In this way, base station 14 performs the corresponding vehicle function as soon as both of the authorization and ToF communications are performed (assuming both are positive). It is envisioned that the ToF communications will conclude faster than the authorization communications. As such, assuming that the ToF communications is positive, base station 14 performs the corresponding vehicle function as soon as the authorization communications is concluded with a positive result. The ToF communications thereby do not add any delay to the wakeup/authorization communication processes.

As shown in FIG. 1, fob 12 includes a low-frequency (LF) receiver 16, an ultra-wide band (UWB) transceiver (transmitter/receiver) 18, and an ultra-high frequency (UHF) transmitter 20. LF receiver 16, UWB transceiver 18, and UHF transmitter 20 have their own antennas as indicated in FIG. 1. LF receiver 16 is operable for receiving LF signals from base station 14. UWB transceiver 18 is operable for transmitting/receiving UWB signals to/from base station 14. UHF transmitter 20 is operable for transmitting UHF signals to base station 14.

As examples, the LF operating frequency range is between 20 to 300 kHz; the UWB operating frequency range is between 3 to 10 GHz including a 3.5 to 6.5 GHz operating range; and the UHF operating frequency range is between 300 MHz to 3 GHz including a 300 MHz to 1 GHz operating range.

As further shown in FIG. 1, base station 14 includes a remote function actuator (RFA) ("controller") 22 and a first satellite unit 24a. Base station 14 may include further satellite units such as a second satellite unit 24b. Controller 22 and satellite units 24a and 24b are located at the vehicle. Satellite units 24a and 24b are positioned at respective locations of the vehicle (e.g., the right vehicle side and the left vehicle side).

Controller 22 includes a LF transmitter 26 and a UHF receiver 28. LF transmitter 26 is associated with one or more antennas such as antennas 30a, 30b, and 30c. Antennas 30a, 30b, and 30c are positioned at respective locations of the vehicle (e.g., center console, right vehicle door, left vehicle door). LF transmitter 26 is operable for transmitting LF signals via antennas 30a, 30b, and 30c to fob 12. UHF receiver 28 has its own antenna and is operable for receiving UHF signals from fob 12. Satellite units 24a and 24b include respective UWB transceivers 32a and 32b. UWB transceivers 32a and 32b are operable for transmitting/receiving UWB signals to/from fob 12.

The wakeup, authorization, and ToF communications between fob 12 and base station 14 take place using LF receiver 16, UWB transceiver 18, and UHF transmitter 20 of the fob, LF transmitter 26 and UHF receiver 28 of controller 22, and UWB transceiver 32a of first satellite unit 24a. The wakeup, authorization, and ToF communications between the receivers, transmitters, and transceivers of fob 12, controller 22, and first satellite unit 24a will now be described. (UWB transceiver 32b of second satellite unit 24b may also be used for ToF communications, but its description will be omitted for simplicity.)

Controller 22 initiates the wakeup communication process in response to detecting a user action such as touching a door handle or pressing the vehicle start button. In this regard, controller 22 includes a door handle detection input 34 and a vehicle start button detection input 36. Upon the user action being detected, LF transmitter 26 of controller 22 transmits a LF wakeup signal along LF communications link 38 for receipt by fob 12. Fob 12 wakes up in response to LF receiver 16 of the fob receiving the LF wakeup signal. In turn, UHF transmitter 20 of fob 12 transmits an UHF acknowledgement signal along UHF communications link 40 for receipt by controller 22.

Controller 22 commences the authorization communications upon UHF receiver 28 of controller 22 receiving the UHF acknowledgement signal. The authorization communications commence with LF transmitter 26 of controller 22 transmitting a LF encrypted challenge signal along LF communications link 38 for receipt by fob 12. Fob 12 generates a response for responding to the challenge signal upon LF receiver 16 of the fob receiving the LF challenge signal. In turn, UHF transmitter 20 of fob 12 transmits an UHF encrypted response along UHF communications link 40 for receipt by controller 22.

UHF receiver 28 of controller 22 receives the UHF encrypted response. Controller 22 analyzes the response from fob 12 to determine whether the response satisfies the challenge signal. If the response from fob 12 satisfies the challenge signal, then controller 22 determines the fob to be authorized for remotely controlling the vehicle. Controller 22 authorizes enablement of a vehicle function (e.g., unlocking a vehicle door or starting the vehicle) corresponding to the detected user action upon determining that fob 12 is authorized.

The ToF communications take place concurrently with the authorization communications between fob 12 and controller 22. The ToF communications commence by UWB transceiver 18 of fob 12 transmitting a UWB initial ping signal along UWB communications link 42a for receipt by first satellite 24a. UWB transceiver 32a of first satellite 24a in response to receiving the UWB ping signal transmits a UWB request signal (e.g., a UWB ranging acknowledgment signal) along UWB communications link 42a for receipt by fob 12. Upon receiving the UWB ranging acknowledgment signal, UWB transceiver 18 of fob 12 transmits a UWB reply signal (e.g., a UWB ranging data signal) along UWB communications link 42a for receipt by first satellite unit 24a.

After UWB transceiver 32a of first satellite unit 24a receives the UWB reply signal, controller 22 measures the time duration from transmission of the UWB request signal by first satellite unit 24a to receipt of the UWB reply signal by the first satellite unit. If the time duration is longer than a predetermined time duration corresponding to a predetermined distance, then controller 22 determines that fob 12 is not within the vicinity of the vehicle (or, more accurately, not within the vicinity of first satellite unit 24a). Controller 22 prevents the enablement of the vehicle function while fob 12 is determined to not be within the vicinity of the vehicle regardless of the authorization decision by the controller.

Figure 5:
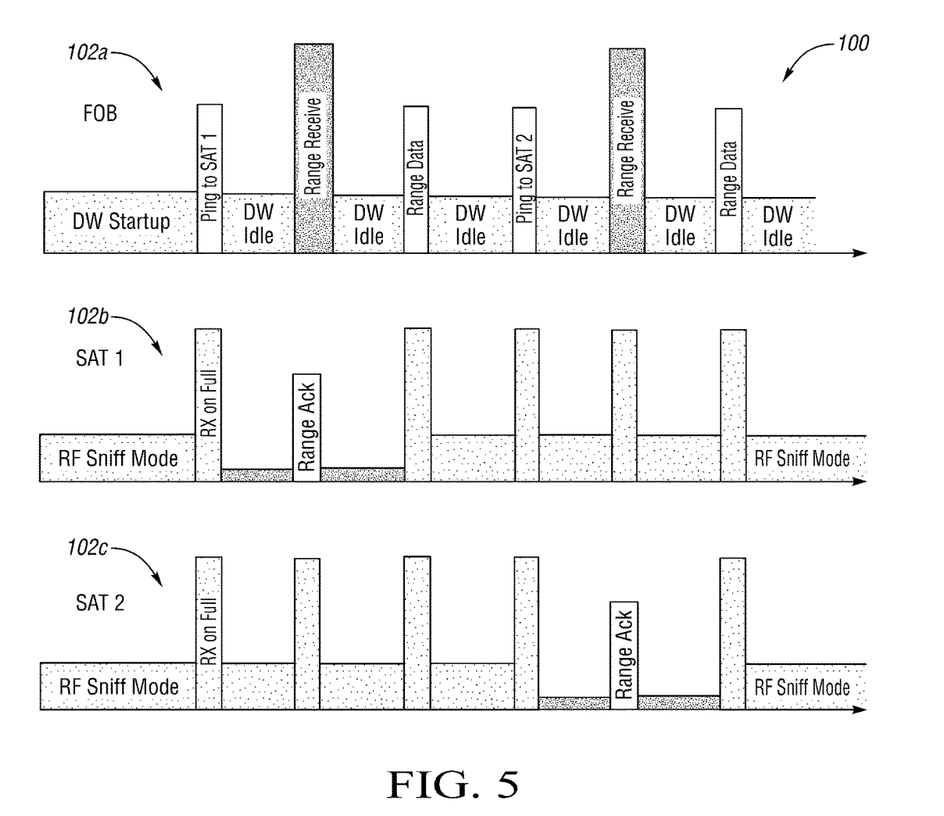
FIG. 5 illustrates a timing diagram of the time of flight communication signals between the remote control unit and first and second satellite units of the base station.

The same ToF communication process between fob 12 and first satellite unit 24a may be performed between the fob and second satellite unit 24b. This may be done to determine whether controller 22 is within the vicinity of the location of second satellite unit 24b. FIG. 5 provides a timing diagram of the ToF communications between fob 12 and first and second satellite units 24a and 24b.

As shown in FIG. 1, controller 22 further includes a microcontroller 44 and a dual local interconnect network (LIN) 46. Microcontroller 44 monitors door handle detection input 34 and vehicle start button detection input 36 to detect user actuation of a door handle or the vehicle start button. Microcontroller 44 handles the wakeup and authorization communication processes of base station 14. Microcontroller 44 controls the transmitting and receiving operations of LF transmitter 26 and UHF receiver 28, respectively, in handling the associated wakeup and authorization communications. Microcontroller 44 is configured to communicate via dual LIN 46 with satellite units 24a and 24b in regards to the ToF communications. As will be explained in greater detail with respect to FIG. 3, the satellite units include microcontrollers which handle the ToF communications process of the satellite units. Microcontroller 44 communicates with the satellite unit microcontrollers to learn whether the ToF communications are positive or negative (i.e., to learn whether fob 12 is within or not within the vicinity of the vehicle).

Controller 22 may be in communication via a vehicle network such as a CAN bus 48 with other vehicle controllers such as a body control module (BCM) 50. Through CAN bus 48 and BCM 50, controller 22 may communicate with an immobilizer antenna unit (IAU) 52. IAU 52 provides LF/LF immobilizer functions to fob 12 for backup starting (i.e., when the battery power of the fob is insufficient).

Figure 2:
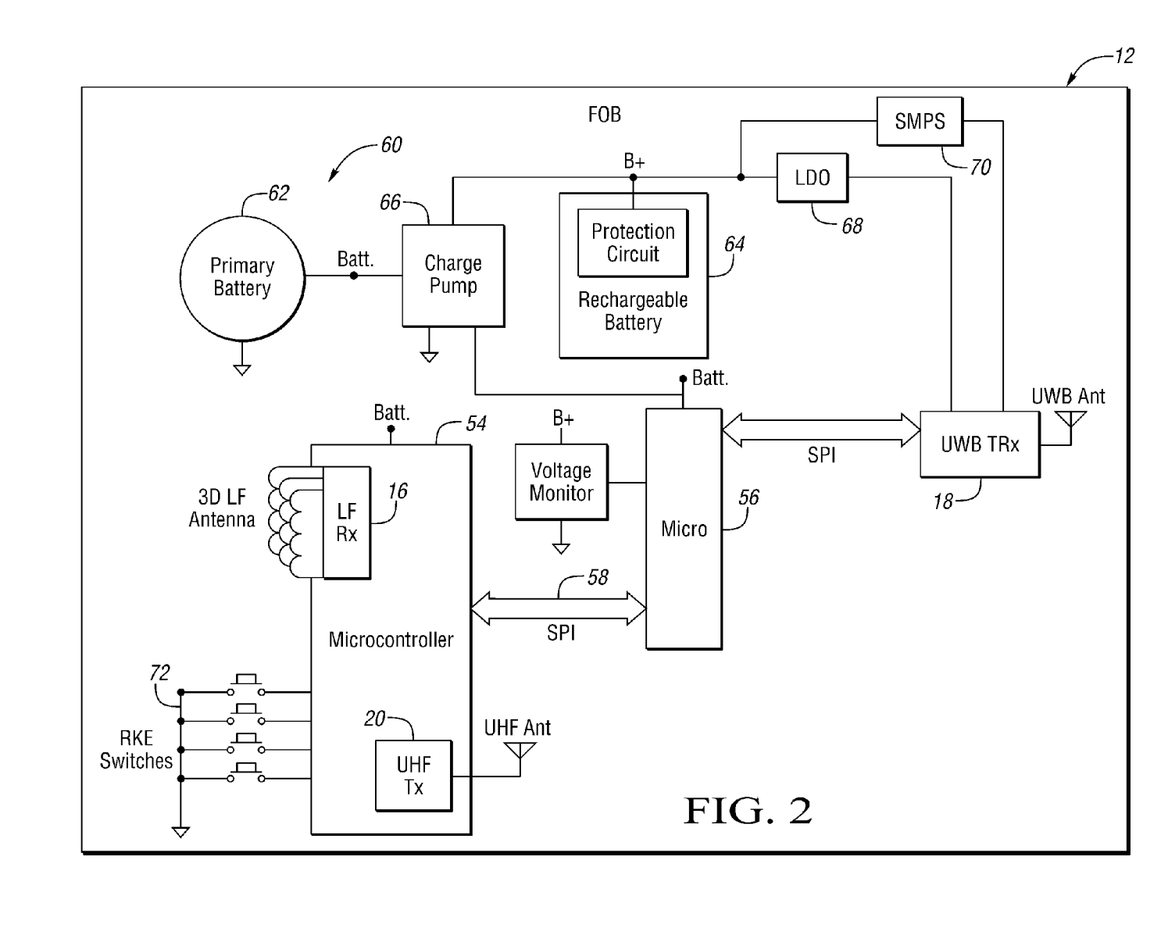
FIG. 2 illustrates a block diagram of the remote control unit in greater detail.

Referring now to FIG. 2, with continual reference to FIG. 1, a block diagram of fob 12 in greater detail is shown. In addition to LF receiver 16, UWB transceiver 18, and UHF transmitter 20, fob 12 includes a first microcontroller 54 and a second microcontroller 56. First microcontroller 54 handles the wakeup and authorization communication processes of fob 12. First microcontroller 54 controls the receiving and transmitting operations of LF receiver 16 and UHF transmitter 20, respectively, in handling the associated wakeup and authorization communications. Second microcontroller 56 handles the ToF communication process of fob 12. Second microcontroller 56 controls the receiving and transmitting operations of UWB transceiver 18 in handling the associated ToF communications.

First and second microcontrollers 54 and 56 of fob 12 are configured to communication with one another via a serial peripheral interface (SPI) 58. Microcontrollers 54 and 56 communicate with one another in regards to the ToF communications. For instance, first microcontroller 54 enables second microcontroller 56 to transmit the UWB initial ping signal and second microcontroller advises the first microcontroller of receipt of the UWB request signal and transmission of the UWB reply signal.

Fob 12 further includes a battery arrangement 60 having a primary battery 62 and a rechargeable secondary battery 64. Battery power (Batt) from primary battery 62 powers microcontrollers 54 and 56. Secondary battery 64 is rechargeable with battery power from primary battery 62. Unlike primary battery 62, secondary battery 64 has the ability to provide a high battery current during short time periods. Secondary battery 64 provides this high battery current to UWB transceiver 18 when UWB transceiver 18 is communicating UWB signals. UWB transceiver 18 requires such high battery current for its operation to receive/transmit UWB signals during the ToF communications process. The ToF communication process occurs during a short time period. As such, secondary battery 64 satisfies the power consumption requirement of UWB transceiver 18. Battery arrangement 60 further includes a charge pump 66, a low-dropout (LDO) regulator 68, and a switched mode power supply (SMPS) 70 for the recharging and discharging operations of secondary battery 64.

First microcontroller 54 of fob 12 further handles RKE functions of the fob. In this regard, first microcontroller 54 monitors RKE switch inputs 72.

Figure 3:
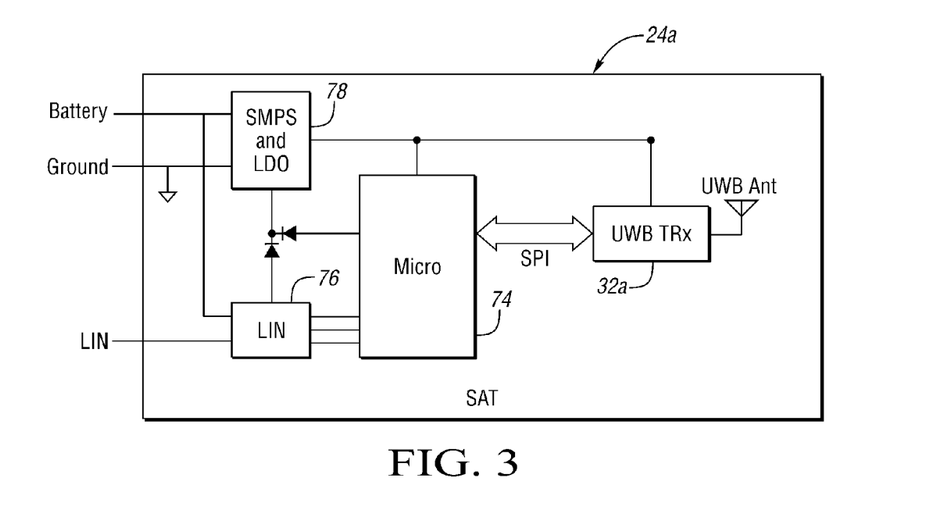
FIG. 3 illustrates a block diagram of a satellite unit of the base station in greater detail.

Referring now to FIG. 3, with continual reference to FIG. 1, a block diagram of first satellite unit 24a of base station 14 in greater detail is shown. In addition to UWB transceiver 32, first satellite unit 24a further includes a microcontroller 74, a LIN 76, and a battery arrangement 78 including a switched-mode power supply (SMPS) and a low dropout regulator (LDO). Battery arrangement 78 is configured to regulate operating power from the vehicle battery to UWB transceiver 32a, microcontroller 74, and LIN 76.

Microcontroller 74 of first satellite unit 24a handles the ToF communication process of the first satellite unit on behalf of base station 14. Microcontroller 74 controls the ToF operation of UWB transceiver 32a in handling the associated ToF communications. Microcontroller 74 is configured to communicate via LIN 76 with microcontroller 44 of controller 22 in regards to the ToF communications. Microcontroller 74 of first satellite unit 24a communicates with microcontroller 44 of controller 22 to advise whether the ToF communications are positive or negative (i.e., to advise whether fob 12 is within or not within the vicinity of the vehicle).

As noted, the ToF communications occur concurrently with the authorization communications. This is enabled as each of fob 12 and base station 14 include two microcontrollers which separately handle the authorization and ToF communications operations. In particular, fob 12 includes first microcontroller 54 which handles the authorization communications on behalf of the fob and second microcontroller 56 which handles the ToF communications on behalf of the fob. Base station 14 includes microcontroller 44 of controller 22 which handles the authorization communications on behalf of the base station and microcontroller 74 of first satellite unit 24a which handles the ToF communications on behalf of the base station. As such, one set of microcontrollers of fob 12 and base station 14 and the remaining set of microcontrollers of the fob and the base station multitask in handling the authorization and ToF communications.

Figure 4:
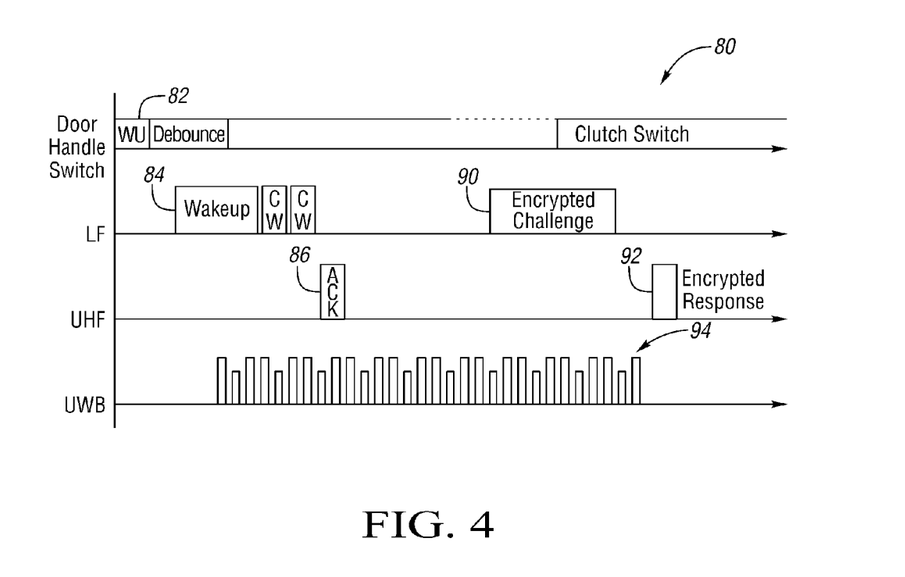
FIG. 4 illustrates a timing diagram of the wakeup, authorization/authentication, and time of flight communication signals between the remote control unit and the base station.

Referring now to FIG. 4, with continual reference to FIG. 1, a timing diagram 80 of the wakeup, authorization, and ToF communication signals between fob 12 and base station 14 is shown. The wakeup communication process initiates, for instance, by door handle detection input 34 generating a trigger pulse 82 in response to a user touching the door handle. In response to the door handle being touched, LF transmitter 26 of controller 22 transmits a LF wakeup signal pulse 84. UHF transmitter 20 of fob 12 transmits an UHF acknowledgement signal pulse 86 after the fob wakes up upon receiving the LF wakeup signal. The UHF acknowledgement signal acknowledges that fob 12 is awake to base station 14.

Base station 14 then initiates the authorization communications by LF transmitter 26 of controller 22 transmitting a LF encrypted challenge signal pulse 90. After fob 12 receives the LF challenge signal, UHF transmitter 20 of the fob transmits a UHF encrypted response pulse 92. The response is the response of fob 12 to the challenge signal. Controller 22 analyzes the response from fob 12 to determine whether the response satisfies the challenge signal. If yes, then fob 12 is authorized to, in this example, unlock the vehicle door.

As indicated in timing diagram 80, the ToF communications 94 between fob 12 and base station 14 take place concurrently with the authorization communications and, in this example, also with the wakeup communications.

Referring now to FIG. 5, with continual reference to FIG. 4, a timing diagram 100 of ToF communication signals between fob 12 and first and second satellite units 24a and 24b of base station 14 is shown. Timing diagram 100 includes a timing diagram portion 102a indicative of the ToF communication signaling of fob 12, a timing diagram portion 102b indicative of the ToF communication signaling of first satellite unit 24a, and a timing diagram portion 102c indicative of the ToF communication signaling of second satellite unit 24b.

Figure 6:
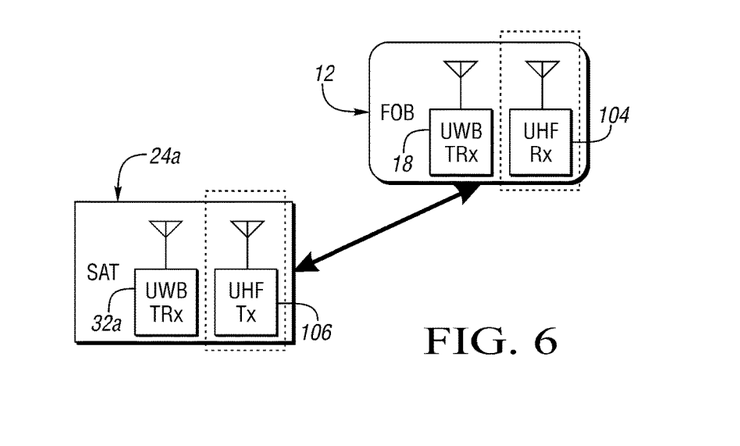
FIG. 6 illustrates a block diagram of the remote control unit and a satellite unit of the base station further configured to provide approach detection features.

Referring now to FIG. 6, with continual reference to FIG. 1, a block diagram of fob 12 and first satellite unit 24a of base station 14 further configured to provide approach detection features is shown. In this regard, fob 12 further includes a UHF receiver 104 and first satellite unit 24a further includes a UHF transmitter 106. UHF transmitter 106 periodically transmits UHF polling signals. Fob 12 wakes up upon its UHF receiver 104 receiving an UHF polling signal. In turn, UHF transmitter 20 (not shown in FIG. 6) of fob 12 transmits a UHF acknowledgement signal.

Upon UHF receiver 28 of controller 22 of base station 14 receiving the UHF acknowledgement signal, the base station enables an approach detection feature (e.g., turning on the vehicle headlamps).

Figure 7A:
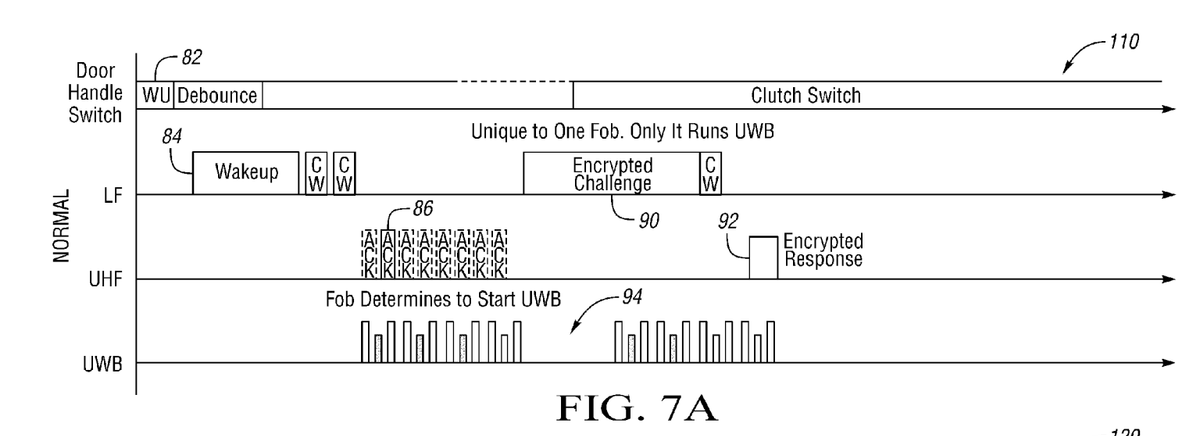
FIG. 7A illustrates a timing diagram of the wakeup, authorization/authentication, and time of flight communications between one of a plurality of remote control units programmed to the base station and the base station.
Figure 7B:
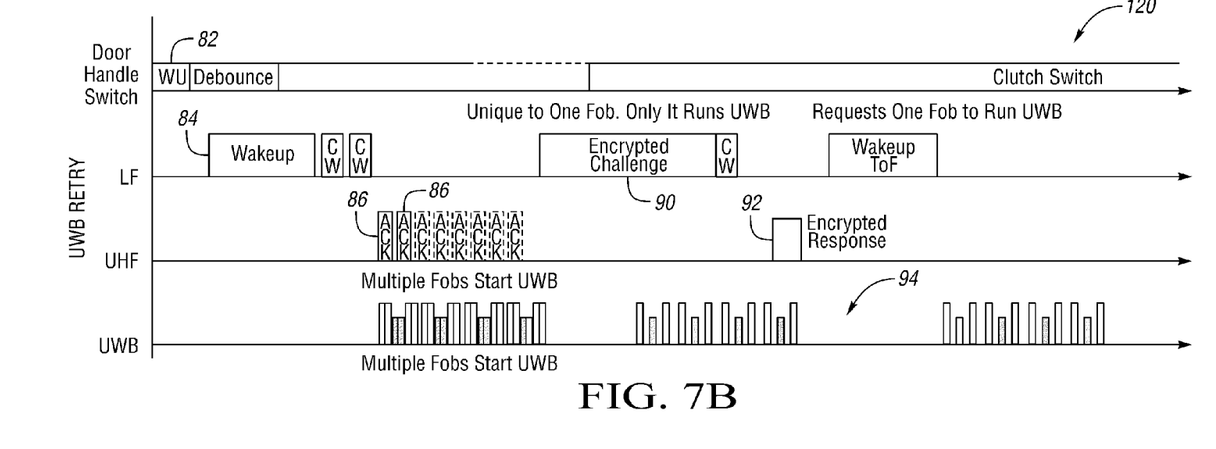
FIG. 7B illustrates a timing diagram of the wakeup, authorization/authentication, and time of flight communications between two of a plurality of remote control units programmed to the base station and the base station.

Referring now to FIGS. 7A and 7B, with continual reference to FIGS. 1, 4, and 6, timing diagrams 110 and 120 of the wakeup, authorization/authentication, and ToF communications between one (FIG. 7A) and two (FIG. 7B) of a plurality of fobs 12 programmed to base station 14 and the base station (FIG. 7A) are shown. Timing diagrams 110 and 120 are indicative of a communications protocol which accounts for multiple fobs 12 being present in the vicinity of base station 14. This communications protocol addresses issues associated with fobs 12 initiating the ToF communications to the satellite units. For the initial LF wakeup, base station 14 does not know which if any fobs may be present. Any fob programmed to base station 14 is to be able to respond to the wakeup and start the UWB ToF communications. When more than one fob is present the fobs could all be transmitting UWB at the same time and interfere with one another.

In FIG. 7A, timing diagram 110, entitled "Normal", illustrates the wakeup, authorization/authentication, and ToF communications when only one fob is present. "Normal" timing diagram 110 is applicable in the case of multiple fobs being present, but only one fob determines that it is to run UWB.

In FIG. 7B, timing diagram 120, entitled "UWB Retry", illustrates the wakeup, authorization/authentication, and ToF communications when two fobs determine that they are to run UWB are present. In this case, the two fobs initially determine that they are to run UWB. Base station 14 subsequently determines the correct fob and has only this fob run UWB for the LF encrypted challenge.

The communications protocol depicted by timing diagrams 110 and 120 is based on the following. First, the fobs will determine on their own if they should start UWB after the initial LF wakeup. This is based on the LF signal level measurements showing it being close to the LF wake up antenna and farther from the other two continuous wave (CW) signal antennas. Second, the initial UWB will run for only a short burst of two ToF ranges to each satellite unit (four ranges total). Third, the LF encrypted challenge will have some bits in the middle of the function code that indicates which is to run UWB. The fobs can detect this and stop any UWB if it is not them. The proper fob can start another short UWB burst before the entire LF message is received. Thus, if two fobs were present and the initial ToF did not provide a range reading to pass relay attack, then base station 14 can insure that only one fob provides range data for the second UWB burst. Fourth, if the first and second periods of UWB lack a ToF range passing relay attack and the encrypted challenge is authenticated, then base station 14 sends a special LF wakeup ToF to run a longer ToF sequence to retry for a passing range value.

As described, in regards to PEPS capability, fob 12 and base station 14 engage in a series of wakeup, authorization, and ToF communications. The authorization communications have been described as using LF and UHF and the ToF communications have been described as using UWB. However, this is only an example. For instance, the authorization and ToF communications could both use UWB. Further, the UWB itself is an example of communications which can provide ToF capability. Other communication protocols which may be substituted in place of UWB for ToF capability include wide-band (WB), Doppler, and UHF.

While exemplary embodiments are described above, it is not intended that these embodiments describe all possible invention forms. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
  communicating authorization signals and time-of-flight (ToF) ranging signals concurrently between a portable controller and a base station at a target to confirm from the authorization signals whether the portable controller is authorized for controlling a function of the target and to confirm from the ToF ranging signals whether the portable controller is within range of the target;
  prior to communicating the authorization signals between the portable controller and the base station, communicating wakeup signals between the portable controller and the base station to wakeup the portable controller and to acknowledge to the base station that the portable controller is awake; and
  preventing the function of the target to be controlled when the portable controller is not within range of the target.

2. The method of claim 1 further comprising:
  enabling the function of the target to be controlled when the portable controller is within range of the target and the portable controller is authorized to control the function of the target.

3. The method of claim 1 further comprising:
  detecting user interaction with the target; and
  wherein communicating the wakeup signals between the portable controller and the base station commences upon the user interaction being detected.

4. The method of claim 1 wherein:
  the target is a vehicle, the user interaction includes one of a door handle of the vehicle being touched and a start button of the vehicle being touched, and the function of the target to be controlled corresponds to the user interaction.

5. The method of claim 1 wherein:
  communicating the ToF ranging signals between the portable controller and the base station commences upon communicating the wakeup signals between the portable controller and the base station.

6. A method comprising:
  communicating authorization signals and time-of-flight (ToF) ranging signals concurrently between a portable controller and a base station at a target to confirm from the authorization signals whether the portable controller is authorized for controlling a function of the target and to confirm from the ToF ranging signals whether the portable controller is within range of the target;
  preventing the function of the target to be controlled when the portable controller is not within range of the target; and
  wherein communicating the authorization signals between the portable controller and the base station is conducted using low-frequency (LF) and ultra-high frequency (UHF) communications and communicating the ToF ranging signals between the portable controller and the base station is conducted using ultra-wide-band (UWB) communications.

7. The method of claim 1 wherein:
communicating the authorization signals and the ToF ranging signals between the portable controller and the base station is conducted using ultra-wide-band (UWB) communications.

8. The method of claim 1 further comprising:
using a first microcontroller of the base station in communicating authorization signals from the base station to the portable controller and in confirming from the authorization signals whether the portable controller is authorized for controlling the function of the target; and
using a second microcontroller of the base station in communicating ToF ranging signals from the base station to the portable controller and in confirming from the ToF ranging signals whether the portable controller is within range of the target.

9. The method of claim 1 further comprising:
using a primary battery of the portable controller in communicating authorization signals from the portable controller to the base station; and
using a secondary battery of the portable controller, rechargeable with energy from the primary battery, in communicating ToF ranging signals from the portable controller to the base station.

10. A system comprising:
a remote control unit;
a base station at a target device;
wherein the remote control unit and the base station are configured to communicate authorization signals and time-of-flight (ToF) ranging signals concurrently between one another;
wherein the base station is further configured to confirm from the authorization signals whether the remote control unit is authorized for controlling a function of the target device and to confirm from the ToF ranging signals whether the remote control unit is within range of the target device;
wherein the base station is further configured to prevent the function of the target device from being controlled by the remote control unit when the remote control unit is not within range of the target device; and
wherein the remote control unit and the base station are further configured to communicate wakeup signals between one another, prior to communicating the authorization signals between one another, to wakeup the remote control unit and to acknowledge to the base station that the remote control unit is awake.

11. The system of claim 10 wherein:
the base station is further configured to enable the function of the target device to be controlled when the remote control unit is within range of the target device and is authorized to control the function of the target device.

12. The system of claim 10 wherein:
the base station is further configured to detect user interaction with the target device; and
the remote control unit and the base station are further configured to communicate the wakeup signals between one another after user interaction with the target device is detected.

13. The system of claim 10 wherein:
the target device is a vehicle, the user interaction includes one of a door handle of the vehicle being touched and a start button of the vehicle being touched, and the function of the target device to be controlled corresponds to the user interaction.

14. The system of claim 10 wherein:
the remote control unit and the base station are further configured to communicate the ToF ranging signals between one another upon commencement of the wakeup signals being communicated between one another.

15. The system of claim 10 wherein:
the remote control unit and the base station are further configured to communicate the authorization signals between one another using low-frequency (LF) and ultra-high frequency (UHF) communications and to communicate the ToF ranging signals between one another using ultra-wide-band (UWB) communications.

16. The system of claim 10 wherein:
the base station includes a first microcontroller configured to operate for the base station to communicate authorization signals to the remote control unit and to confirm from the authorization signals whether the remote control unit is authorized for controlling the function of the target device; and
the base station further includes a second microcontroller configured to operate for the base station to communicate ToF ranging signals to the remote control unit and to confirm from the ToF ranging signals whether the remote control unit is within range of the target device.

17. The system of claim 10 wherein:
the remote control unit includes a primary battery for providing power for the remote control unit to communicate authorization signals to the base station; and
the remote control unit further includes a secondary battery, rechargeable with energy from the primary battery, for the remote control unit to communicate ToF ranging signals to the base station.

* * * * *